US010637766B2

(12) United States Patent
Ubaldi et al.

(10) Patent No.: US 10,637,766 B2
(45) Date of Patent: Apr. 28, 2020

(54) RESOURCE PROVISIONING IN A VIRTUALIZED NETWORK

(71) Applicant: Telefonaktiebolaget LM Ericsson (publ), Stockholm (SE)

(72) Inventors: Fabio Ubaldi, Pisa (IT); Francesco Giurlanda, Pisa (IT); Paola Iovanna, Pisa (IT); Sandro Noto, Pisa (IT); Alessandro Priola, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 7 days.

(21) Appl. No.: 15/569,434

(22) PCT Filed: Apr. 27, 2015

(86) PCT No.: PCT/EP2015/059105
§ 371 (c)(1),
(2) Date: Oct. 26, 2017

(87) PCT Pub. No.: WO2016/173618
PCT Pub. Date: Nov. 3, 2016

(65) Prior Publication Data

US 2018/0302316 A1 Oct. 18, 2018

(51) Int. Cl.
*H04L 12/725* (2013.01)
*H04L 12/715* (2013.01)
(Continued)

(52) U.S. Cl.
CPC .......... *H04L 45/04* (2013.01); *H04L 43/0882* (2013.01); *H04L 45/125* (2013.01); *H04L 45/302* (2013.01); *H04L 45/70* (2013.01)

(58) Field of Classification Search
CPC ..... H04L 12/715; H04L 12/721; H04L 12/26; H04L 12/56; H04L 12/54; H04L 45/04;
(Continued)

(56) References Cited

U.S. PATENT DOCUMENTS 6,788,646 B1 * 9/2004 Fodor ................. H04L 12/5602 370/229
7,317,684 B2 * 1/2008 Fodor ..................... H04L 45/00 370/231
(Continued)

FOREIGN PATENT DOCUMENTS

WO 2009118050 A1 10/2009
WO 2011103913 A1 9/2011
(Continued)

OTHER PUBLICATIONS

A Path Computation Element (PCE)-Based Architecture (Year: 2006).*
(Continued)

*Primary Examiner* — Jeffrey M Rutkowski
*Assistant Examiner* — Luna Weissberger
(74) *Attorney, Agent, or Firm* — Patent Portfolio Builders, PLLC

(57) ABSTRACT

Resource provisioning in a virtualized network Within a network comprising a plurality of domains, an end-to-end route for a required service is computed by setting a respective parameter value for each of a plurality of paths in a domain. Each parameter value is based on resources that are available for the required service, and the parameter value is dependent on a priority given to said service. The end-to-end route for the required service is selected based on said parameter values.

12 Claims, 5 Drawing Sheets

600
Memory 612
610 Processor
Orchestrator 110
160 Virtualizer
PCE 200
602 IF
IF 604
120a Domain
Virtual resources manager 120b

(51) Int. Cl.
*H04L 12/729* (2013.01)
*H04L 12/26* (2006.01)
*H04L 12/721* (2013.01)

(58) Field of Classification Search
CPC ..... H04L 45/70; H04L 45/00; H04L 43/0082; H04L 43/0876; H04L 43/08
USPC .......................................................... 370/389
See application file for complete search history.

(56) References Cited

U.S. PATENT DOCUMENTS

2003/0214938 A1* 11/2003 Jindal ..................... H04L 45/00 370/351
2005/0066053 A1* 3/2005 McDysan ............ G06Q 20/102 709/243
2006/0013230 A1* 1/2006 Bosloy .................... H04L 45/00 370/395.42
2006/0291447 A1* 12/2006 Siliquini ........... H04L 29/06027 370/352
2009/0129405 A1* 5/2009 Lauwers ............. H04L 41/0896 370/468
2010/0061231 A1* 3/2010 Harmatos ............... H04L 45/02 370/228
2010/0124196 A1* 5/2010 Bonar .................. H04B 7/0689 370/329
2011/0019674 A1* 1/2011 Iovanna .................. H04L 45/02 370/392
2013/0114409 A1* 5/2013 Iovanna .................. H04L 45/02 370/235
2015/0215235 A1* 7/2015 Li ......................... H04L 47/782 370/235
2016/0248703 A1* 8/2016 Gopalakrishnan ...... H04L 49/70

FOREIGN PATENT DOCUMENTS

WO 2013079225 A1 6/2013
WO 2016116152 A1 7/2016

OTHER PUBLICATIONS

A traffic engineering system for multilayer networks based on the GMPLS paradigm (Year: 2003).*

IQV Anna P et al: “A traffic engineering system for multilayer networks based on the GMPLS paradigm”,IEEE Network, IEEE Service Center, New York, NY, US, vol. 17, No. 2, Mar. 1, 2003 (Mar. 1, 2003), pp. 28-37 (Year: 2003).*

Bari, Faizul et al., “Data Center Network Virtualization: A Survey”, IEEE Communications Surveys & Tutorials, vol. 15, Issue: 2, Second Quarter 2013, Sep. 20, 2012, 909-928.

Braden, R. et al., “Integrated Services in the Internet Architecture: an Overview”, Network Working Group, Request for Comments: 1633, Jun. 1994, 1-33.

Elwalid, Anwar et al., “A New Approach for Allocating Buffers and Bandwidth to Heterogeneous, Regulated Traffic in an ATM Node”, IEEE Journal on Selected Areas in Communications, vol. 13, No. 6, Aug. 1995, 1-22.

Iovanna, Paola et al., “A Traffic Engineering System for Multilayer Networks Based on the GMPLS Paradigm”, IEEE Network vol. 17, Issue: 2, 28-37, Mar. 26, 2003.

Unknown, Author, “Welcome to Apache™ Hadoop®!”, The Apache Software Foundation, 2014, 1-10.

Office Action issued in corresponding EP Application No. 15720939.6; dated Aug. 5, 2019; 08 pages. All references not cited herewith have been previously made of record.

* cited by examiner

RESOURCE PROVISIONING IN A VIRTUALIZED NETWORK

TECHNICAL FIELD

The present invention relates to a method and apparatus for provisioning resources in a virtualized network

BACKGROUND

With the advent of cloud computing and data center based services, requests for high bandwidth and dynamic end-to-end (E2E) connectivity are enormously increased. Networks may be composed of heterogeneous domains that differ in, for example, management and geographic locations, and may have vendor-specific technologies. In this context, to efficiently manage the network and automatically provide E2E connection becomes critical. The sharing of local information, such as the complete network topology, becomes difficult, especially if network domains are managed by different entities. An efficient abstraction of the transport layer simplifies interworking of different administrative and technology domains and enables E2E routing solutions.

Network virtualization is a promising trend of enabling effective management of networks. In this context the transport network assumes a new role of providing dynamically E2E connectivity. One of the main aspects of network virtualization is the ability to create a smart logical and abstract view of the physical network resources (like packet and optical switches, routers, etc.) that allows for hiding hardware complexity and constraints.

Data centers may be distributed around a network, either in parts of the network with high throughput, or near the access part of the network. Data centers may provide some services, for example user interactive services such as web gaming, that require guarantees of low network delays, and may also provide some other services, for example particularly data-intensive services, that require guarantees of a particular data throughput.

Physical resources still need to be allocated in such a virtualized network.

SUMMARY

According to a first aspect there is provided a method of selecting an end-to-end route within a network comprising a plurality of domains. The method comprises: for a required service, and for each of a plurality of paths in a domain, setting a respective parameter value, wherein each parameter value is based on resources that are available for the required service, said parameter value being dependent on a priority given to said service; and selecting the end-to-end route for the required service based on said parameter values.

Each parameter value may be based on the resources on one of the paths associated with a respective virtual link, excepting resources already allocated to other services having a higher priority than said service. Alternatively, each parameter value may be based on the resources on one of the paths associated with a respective virtual link, excepting resources already allocated to other services having a priority that is higher than or equal to the priority given to said service.

Each parameter value may be further based on elastic resources available on the path.

In some examples, the resources comprise a bandwidth.

In some examples, the method comprises: setting the respective parameter value for each of the plurality of virtual links in the domain; excluding any virtual links for which the bandwidth required by the service is not less than the virtual bandwidth of said link; and if any virtual links are not excluded, selecting a path from a virtual link that has not been excluded.

In that case, the method may further comprise, when excluding any virtual links for which the bandwidth required by the service is not less than the virtual bandwidth of said link, additionally excluding any virtual links for which the maximum bandwidth that may be required is (is less than a bandwidth corresponding to the parameter value set for the required service.

The method may further comprise, if all virtual links are excluded: reinstating the excluded links; excluding any virtual links for which the bandwidth required by the service is not less than the sum of the virtual bandwidth of said link and a margin parameter; and if any virtual links are not excluded, selecting a path from a virtual link that has not been excluded.

In that case, the method may further comprise, if all virtual links are excluded, rejecting a request to set the route.

The method may comprise selecting an end-to-end route, wherein the end-to-end route comprises a virtual link in at least one domain of the network.

In some examples, the method comprises, in the or each domain containing a virtual link of the selected end-to-end route, selecting for said virtual link a path that has the minimum value of the sum of the resources on the path and the elastic resources available on the path, excepting resources already allocated to other services having a higher priority than said service, where said sum of said resources exceeds the resources required for said service.

According to a second aspect there is provided a method for selecting a path for a requested service within a domain of a multi-domain network. The method comprises: for a virtual link that can be represented by a plurality of physical paths, evaluating for each path the sum of the resources on the path and the elastic resources available on the path, excepting resources already allocated to other services having a priority that is equal to or higher than a priority of said requested service. From the paths for which said sum of said resources exceeds the resources required for said service, the path which has the minimum value of the sum of said resources is selected.

According to a third aspect there is provided a network node, configured for performing a method according to the first or second aspect.

According to a fourth aspect there is provided a computer program product, configured when run on a computer to conduct a method according to any example.

BRIEF DESCRIPTION OF THE DRAWINGS

Aspects of the present disclosure will be described, by way of example only, with reference to the drawings, in which.

DETAILED DESCRIPTION

Figure 1:
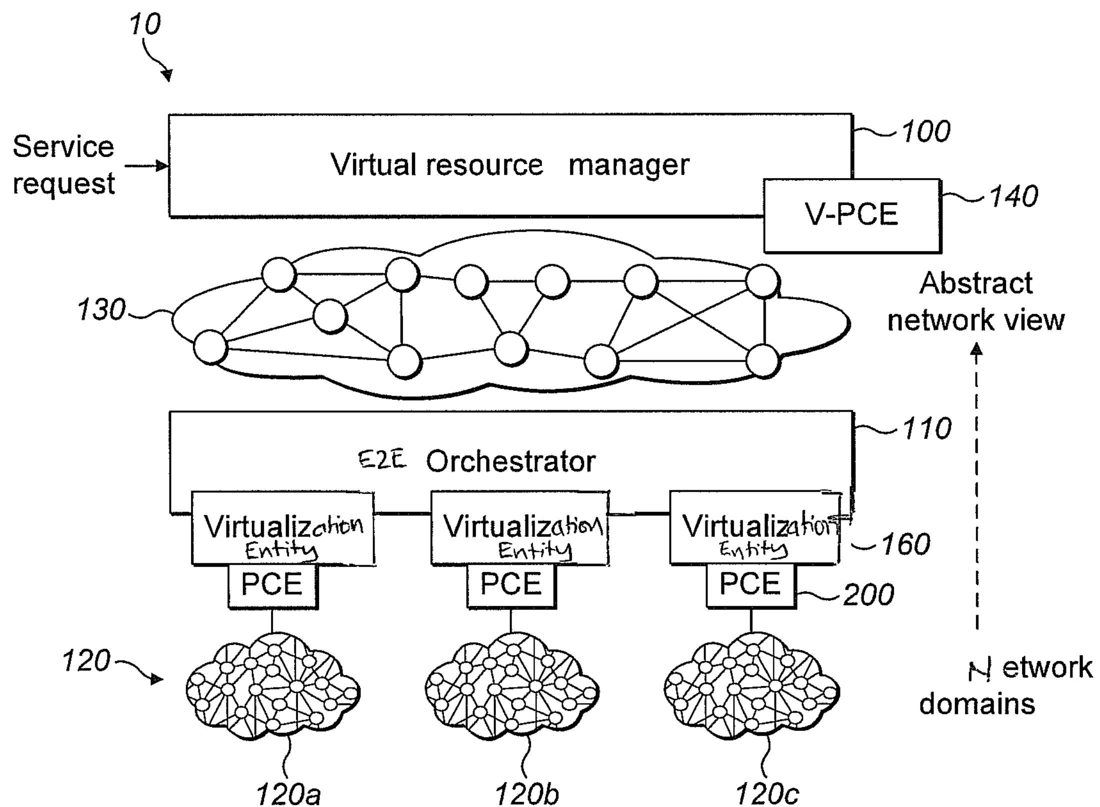
FIG. 1 shows an example of a system architecture.

FIG. 1 shows an example of an architecture 10 in which aspects are implemented. The architecture 10 comprises two main functional components: a Virtual Resource Manager 100 and an End-to-End (E2E) Orchestrator 110. The Virtual Resources Manager 100 is appointed to manage E2E resources. The E2E resources are the virtual resources obtained by summarising the available physical resources (e.g., link, bandwidth, elasticity capability). The Virtual Resources Manager 100 validates and authorizes resource requests and consequently manages the underlying transport network, e.g. a multi-domain network 120. Three domains of the multi-domain network 120 are shown as 120*a*, 120*b*, 120*c*. The three domains 120*a*, 120*b*, 120*c* are an example of a multi-domain network 120.

In some examples, a plurality of the domains of the network 120 are heterogeneous. The heterogeneity could be: at technology level (e.g. packet , optical, etc.), and/or at control level, (e.g. one domain controlled by Software Defined Networking (SDN), another by distributed control such as Generalized Multi-Protocol Label Switching (GMPLS), another is managed by a Network Management System (NMS) only without control plane). In some examples, some of the domains have different vendors. Each domain may or may not have a Path Computation Element (PCE) internal to the domain.

The Virtual Resources Manager 100 works based on a virtualized summary 130 of the physical network. The Virtual Resources Manager 100 is arranged to manage E2E resources. The Virtual Resources Manager 100 validates and authorizes service requests and consequently manages the underlying network working on the abstract topology to provide E2E connections.

A Virtual Path Computation Element (V-PCE) 140 may be provided, such that it is able to select an E2E path in an efficient way working on the logical network provided to the Orchestrator 110. In one embodiment the Virtual Resources Manager 100 may include PCE functionalities or the Virtual Resources Manager 100 interacts with an external PCE to compute E2E paths across the multi-domain network 120.

The Orchestrator 110 is responsible for providing, and in some examples determining, an abstract view of the network for an efficient path handling in the upper-layer network, that is in the Virtual Resources Manager 100. The Virtual Resources Manager 100 performs a more efficient path handling when an abstract topology is provided. In some aspects the Orchestrator 110 harmonizes information provided by each domain 120*a*, 120*b*, 120*c* to provide to the Virtual Resources Manager 100 a unified abstract view of the physical network. The Orchestrator 110 creates the overall abstract topology.

To do this, a Virtualization Entity (or Virtualizer) 160 collects information (including elasticity information) provided by each domain and translates it into service parameters. The Virtualization Entity 160 is configured to collect information about the available physical resources. In some examples, each Virtualization Entity 160 operates on one physical domain. In some aspects, one or more Virtualization Entity is configured to receive a list of paths for each edge point from each domain, or from the entire topology. In some aspects, the Virtualization Entity 160 carries out a computation by itself on such a list of paths.

In one embodiment the or each Virtualization Entity 160 is in communication with, or comprises, a Path Computation Element (PCE) 200. Each domain has an associated PCE 200. The PCE 200 has the function of determining a path, in the form of a physical path, of an associated domain, e.g. domain 120*a*. The Virtualization Entity 160 is configured to determine physical links which are able to carry traffic according to a calculated virtual path. In some examples, a virtual link in, or across, a domain is provided to the Virtualization Entity 160. The Virtualization Entity 160 is configured to receive such a request to carry traffic on a virtual link. The Virtualization Entity 160 is configured to select or identify one or more physical path corresponding to that virtual link. The physical path may be identified by one or more of: nodes, label switched paths, links or segment identifiers.

The architecture shown may be considered as showing physical network domains 120 at the bottom, progressing to an abstract network view towards the top of FIG. 1.

In one embodiment, the architecture is implemented as a Software Defined Network (SDN) architecture.

In aspects of the present solution, the Virtual Resources Manager 100 is provided by the Orchestrator 110 with parameters (including one or more elasticity parameter), and in this way the Virtual Resources Manager 100 manages elasticity without knowing the specific techniques implemented in the underlying domains. This is possible because elasticity parameters refer to the virtualised network. In other words, elasticity parameters represent elasticity capability in the virtual network.

In some examples, the Orchestrator 110 receives information of an elasticity capability (i.e. an elasticity parameter) of the physical links from each network domain 120. The Virtualizer 160 communicating with the Orchestrator defines the elasticity parameters to describe the underlying network topology using technology independent, very high level language. The Virtualizer 160 has summarised physical paths according to one or more parameter (e.g., bandwidth, delay) and elasticity parameters into virtual links.

In some aspects, the parameters may be considered as a service parameter or a Quality of Service (QoS) parameter. A further parameter is an elasticity parameter. The orchestrator 110 associates each virtual link elasticity parameter inferred from the physical paths and produces a topology of the virtual network. Each physical path is associated with a service parameter and an elasticity parameter.

The elasticity features in network virtualization provides the ability to provide dynamically enough resources to the service during its lifetime in order to assure the agreed SLA. This means that if a service requires more/less network resources in the time, the network has to quickly react adding/releasing physical resources. Aspects of the invention provide for selection of physical paths according to a requested elastic parameter. The physical path selected satisfies the requested service parameter (e.g. bandwidth) and a requested elasticity parameter (e.g. additional bandwidth). The selection identifies an optimal physical path to provide the requested parameters of the virtual link.

Aspects provide a method to improve E2E resource allocation. The method may be considered to organize and summarize the physical resources to simplify the virtualization topology of E2E multi-domain transport network. A selection is made of intra-domain paths which allows a better usage of the physical resources for an efficient E2E path handling for a specific requested service.

In a multi-domain network 120, as shown in FIG. 1, it is a challenge to provide E2E connectivity with particular QoS requirements.

In E2E path calculation, there is not a detailed knowledge of the physical domains. The path identification is performed on the basis of the abstract topology. Providing an efficient abstract view of the network is a key challenge, as is allocating actual physical resources according to the abstract view.

Figure 2:
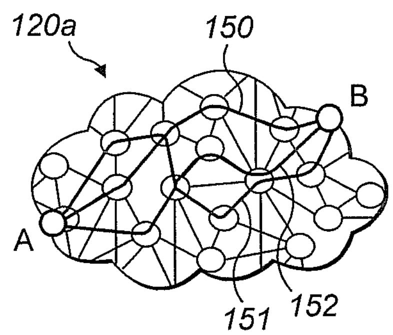
FIG. 2 shows an example illustrating paths within a domain.

FIG. 2 shows an example domain 120*a*, having end nodes A and B as examples of border nodes. For a virtual path between the pair of end nodes A and B, a plurality of physical paths may be used to carry traffic. Three example physical paths 150, 151, 152 are shown. The physical path selected is not known to the virtualized network. In examples, the physical path within a domain is selected according to a service parameter and an elasticity parameter requested at the virtual network level (i.e. virtual link).

Each domain 120*a*, 120*b*, 120*c*, for each pair of end nodes, may provide a set of available paths that provide intra-domain connectivity to the Virtualization Entity 160. Each domain has topologic and routing information. The domain may provide this information in any suitable manner.

In some examples, each path is described in terms of QoS (service) parameters, e.g. bandwidth. For the sake of simplicity, bandwidth is described as the constraint as an example. Embodiments are not limited to bandwidth, and other parameters may be used instead or in addition, for example, parameters relating to delay, resiliency or jitter.

In some examples, each physical path 151, 152, 153 is described using multiple parameters, which, for example, include a service parameter and an elasticity parameter. The service parameter and elasticity parameter are associated with a physical path. The elasticity parameter indicates an amount of improvement which can be provided to the service parameter using elasticity. For the example of bandwidth, each physical path (i) may be described using the two parameters:

1) Br: bandwidth associated to the physical path (service parameter),
2) Er: maximum bandwidth extension achievable (elasticity parameter).

The specific value assumed by the elasticity parameter depends on the particular elasticity techniques implemented in the domain. For example, in a Multiprotocol Label Switching (MPLS) domain the elasticity parameter can be set to the difference between the available link bandwidth and the bandwidth allocated to the given Label Switched Path (LSP). In this way, it is possible to change, e.g. by using the Resource Reservation Protocol (RSVP), the bandwidth associated to the LSP until the maximum link capacity is reached.

Alternatively or in addition, elasticity may be provided by moving the traffic to another path with more bandwidth availability. In this case, the bandwidth extension is the difference between the "new" path available bandwidth and the previously allocated bandwidth (on the "original" path)). This parameter is exposed to the virtual network. Given the path characterization, the Virtualization Entity sorts the paths based on bandwidth constraints and organizes them in a database (one for each pair of end nodes).

Below is a table, showing examples of parameters as entries in a database. The table illustrates the parameters for one specific pair of border nodes in a specific domain of the network. There may be multiple physical paths that could link this pair of border nodes. As shown in the table, the different physical paths corresponding to a virtual link A-B are identified with a respective path identifier Path 1, Path 2, Path 3 (it being understood that there may be any number of paths corresponding to the specific pair of end nodes A and B). Associated with each physical path is a respective value of a service parameter $B_{r1}$, $B_{r2}$, $B_{r3}$ (which in this example is the bandwidth associated with the physical path) and a value of an elasticity parameter $E_{r1}$, $E_{r2}$, $E_{r3}$ (which in this example is the maximum bandwidth extension achievable).

| Physical paths for virtual link A-B | Bandwidth reserved | Elastic capability | Total bandwidth reserved by high priority services | | |
|---|---|---|---|---|---|
| Path 1 | $B_{r1}$ | $E_{r1}$ | $\Sigma DS_{hp1}{}^{1}$ | . . . | $\Sigma DS_{hp1}{}^{n}$ |
| Path 2 | $B_{r2}$ | $E_{r2}$ | $\Sigma DS_{hp2}{}^{1}$ | . . . | $\Sigma DS_{hp2}{}^{n}$ |
| Path 3 | $B_{r3}$ | $E_{r3}$ | $\Sigma DS_{hp3}{}^{1}$ | . . . | $\Sigma DS_{hp3}{}^{n}$ |

This table also shows that the Virtualization Entity also generates a series of values of a service-oriented parameter, indicated as $\Sigma DS_{HP}$. This parameter is calculated based on the fact that networks may provide different services (for example in data centers that may provide some services that require guarantees of low network delays, and other services that require guarantees of a particular data throughput), and that these services may be given different priority levels. The service-oriented parameter for a particular physical path may have a different value for each service, with the respective value being based on the bandwidth that has been reserved on that physical path for services with a priority that is higher than or equal to the priority of that service.

The table shows the values of the service-oriented parameter, for a particular path k, as $\Sigma DS_{hpk}{}^{1}$ (for the highest priority service), . . . , $\Sigma DS_{hpk}{}^{n}$ (for the lowest priority service).

The orchestrator 110 is configured to summarize the information inserted in the databases about the virtual link A-B (and each other virtual link that can be defined between a respective pair of end nodes), and to supply this information to the Virtual Resources Manager 100.

The virtual link A-B, exposed to the Virtual Resources Manager, summarizes the resource availability between the two nodes and is described in terms of various parameters.

In some examples, two service-independent virtualization parameters are defined. One virtualization parameter may be a virtual service parameter, e.g. virtual Bandwidth (vB). In some examples, the virtual service parameter is defined as the maximum (i.e. best) service parameter in a basket of physical links corresponding to the virtual link. For example, the virtual bandwidth is defined as the vB=$\max_i Br_i$, which is the maximum bandwidth available in the basket of paths i for a virtual link.

A further one or more parameter indicates the Virtual Elasticity (vE). The virtual Bandwidth (vB) and Virtual Elasticity (vE) may alternatively be considered as examples of the service parameter and elasticity parameter of the virtual link. In some examples, these parameters are referred to as the virtual service parameter and virtual elasticity parameter.

In some examples, the elasticity of the virtual link is indicated by one or both of a first elasticity parameter (vE1) and a second elasticity parameter (vE2).

In more detail, first elasticity parameter represents the elasticity that the network may always provide without requiring traffic to be moved to another path, which may cause traffic interruption.

The first elasticity parameter of the virtual link may be defined as $vE1=\min_i(Er_i)$. The first elasticity parameter of the virtual link takes the value of a minimum value of elasticity of a physical path. Exposing this value provides a guarantee of the provisioning of such elasticity.

The second elasticity parameter of the virtual link is the maximum elasticity the network is able to provide. Thus, the second elasticity parameter of the virtual link indicates the total elasticity, which may include moving traffic to another path and/or require disruption to traffic. The other path may be an alternative path or an additional path.

The second elasticity parameter of the virtual link of the virtual link may be defined as:

$$vE2=\max_i(Br_i+Er_i)-vB$$

The second virtual elasticity parameter corresponds to a difference between the maximum total service parameter (e.g. bandwidth), including elasticity, for the physical paths i and the bandwidth of the virtual link (vB) without elasticity. The second elasticity parameter takes the value of the physical path with the maximum value of the elasticity that can be provided, as defined above. The parameter vB represents a value of bandwidth that is exposed in the virtualized network. In some aspects, the parameter vB is the bandwidth of the path with the maximum bandwidth among the list of physical path comprising the virtual path.

The exposure of values of both the first and second virtual elasticity parameter provides compatibility with a solution where elasticity with or without traffic interruption is provided in the virtual network.

These two parameters are technology independent. For example, these parameters are applicable to a packet switched network and an optically switched network. The parameters are independent of the specific elasticity technique adopted from each domain.

In examples described herein, a service-oriented virtualization parameter is also defined.

Thus, for each differentiated service (DS)j that the service can require from the network, a parameter is defined (for example by the Virtualization Entity) and exposed to the network abstraction and supplied to the Virtual Resources Manager. The service-oriented parameter, represents the available bandwidth that can be provided by a virtual link for the DS j.

The parameter $vDS_j$, can be computed using the following formula:

$$vDS_j = \max_{paths \ldots \in \ldots VL}(Br + Er - \Sigma\ DS_{HP})$$

where:

Br is the reserved or allocated bandwidth on the path associated with one particular virtual link;

Er is the elastic bandwidth available on the path associated with that virtual link; and $DS_{HP}$ is the bandwidth needed by the services that have a higher or equal priority than j and that have previously been allocated to the path associated with the virtual link.

Thus, for a particular virtual link VL corresponding to a particular pair of end nodes, and for a particular requesting service DS j, the Virtualization Entity is able to determine which path (i.e. physical link) has the highest available bandwidth, taking account of the bandwidth on the path, and the elastic resources available on the path, but excluding resources on the path that have already been allocated to other services, where those other services have a priority that is higher than or equal to the priority given to said requesting service.

This parameter is exported in the abstract network view provided by the orchestrator 110 to the Virtual Resources Manager 100, and represents the bandwidth capability that the virtual link is able to provide to the service j. It will be apparent that this bandwidth depends on the priority that is given to the specific service j being requested. That is, the bandwidth that the virtual link is able to provide to the service j will tend to be higher, if the priority that is given to the service j is higher.

Although the parameter $vDS_j$, is described here in terms of the bandwidth that can be provided to a particular service, it should be noted that one or more alternative parameters can be defined, and subsequently used in a similar manner, with the alternative parameter being related to one or more other resources that can be made available for a particular service.

Figure 3:
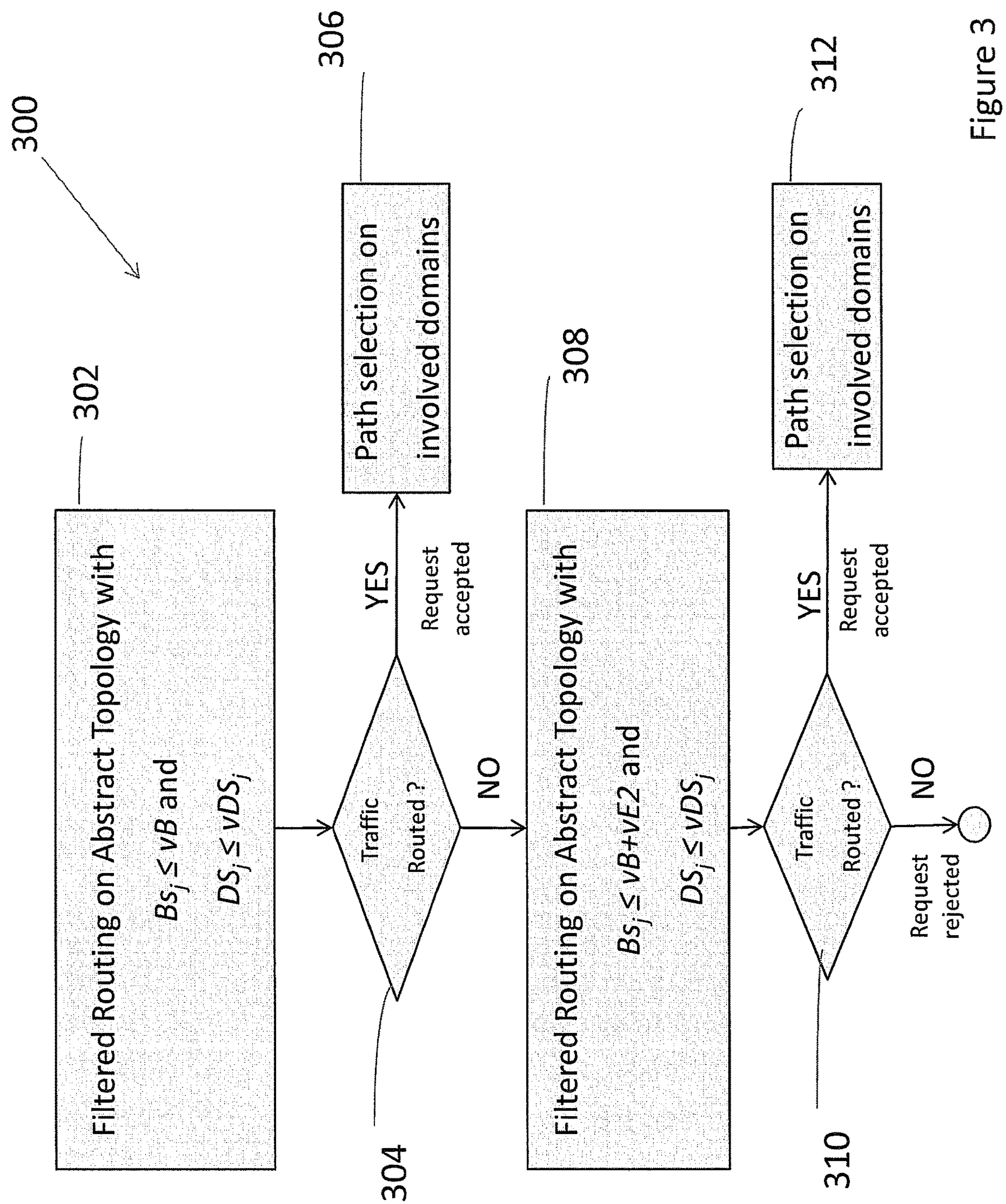
FIG. 3 shows an example of a first method according to an example.

FIG. 3 is a flow chart, illustrating example steps of a method 300 to determine whether to accept a service request. If a request is accepted, a path selection procedure is then performed to select the needed resources in the physical domain. In some examples, this method is implemented in the Virtual Resources Manager 100.

In some examples, if a service wishes to use the network to transport a particular kind of traffic, the service informs the network about what kind of traffic is to be transported, and the performance requirements of that traffic. This information may be presented to the network in the form of a traffic contract, e.g. Service Level Agreement (SLA).

In some examples, the service request may include a guaranteed parameter and a peak parameter, indicating a minimum level required and a maximum level. In terms of bandwidth, the service request may be described as guaranteed bandwidth and a peak bandwidth.

The guaranteed bandwidth is the bandwidth for which specific QoS constraints are required, peak bandwidth is the maximum bandwidth the service may require. While the guaranteed bandwidth is always provided, in some examples, the peak bandwidth is allowed only if elasticity may be provided.

According to the proposed method, when a new service request arrives, the Virtual Resources Manager 100, working on the abstract topology received from the E2E Orchestrator 110, decides if the request may be accepted or not (that is, it checks if there are sufficient resources to satisfy the request).

At a virtual layer, the virtual path is computed using a classical PCE algorithm (e.g. in the V-PCE) that works on the abstract topology. Given that, for each virtual link a physical path has to be selected in the database.

As described in more detail below, the method is able to dynamically provide resources to E2E services guaranteeing the Service Level Agreement (SLA) that is applicable to the specific service being requested. Thus, E2E services can require different treatments, defined by their respective SLAs, that the network has to provide. One example of a required treatment is containing the E2E service delay under a fixed value, while another example is guaranteeing a particular bandwidth to a service. As a generic treatment can be mapped in a specific bandwidth requirement, the bandwidth is considered as the relevant parameter in the specific examples described below, but it must be appreciated that other parameters could be used in similar ways.

Based on the received service request, FIG. 3 shows the End-to-End path computation method that can be used (for example in the Virtual Path Computation Element (V-PCE) 140 associated with the Virtual Resources Manager 100) to determine the path through the network 120.

In the illustrated example, this method is performed on the abstract topology provided by the Orchestrator. In step 302, the set of virtual links is filtered, by excluding any links that do not meet the two conditions:

$Bs_j \leq vB$, and $DS_j \leq vDS_j$, where:

$Bs_j$ represents the current bandwidth that is required by the service that is being requested, vB is the virtual service parameter, e.g. virtual Bandwidth, described above, $DS_j$ represents the bandwidth needed by the service to satisfy the SLA negotiated for the service in each moment of its lifecycle, and therefore represents the maximum bandwidth value that the system may need to be able to provide, rather than the value that is requested at any particular time in the lifecycle of the service, and $vDS_j$ is the service-oriented virtualization parameter described above.

Thus, step 302 removes any virtual links that do not satisfy the two indicated conditions, and the process passes to step 304, in which it is determined if the request can be routed. If there is at least one virtual link that does satisfy the two indicated conditions, the process passes to step 306, in which a path is selected.

If it is determined in step 304 that there are no links that meet the two conditions, the process passes to step 308.

In step 308, the original set of virtual links is again filtered, but this time by applying conditions that are less strict than those used previously. Specifically, in step 308, the set of virtual links is filtered by excluding any links that do not meet the two conditions:

$Bs_j \leq vB + vE2$, and $DS_j \leq vDS_j$, where, again:

$Bs_j$ represents the current bandwidth that is required by the service that is being requested, vB is the virtual service parameter, e.g. virtual Bandwidth, described above, $DS_j$ represents the bandwidth needed by the service to satisfy the SLA negotiated for the service in each moment of its lifecycle, and therefore represents the maximum bandwidth value that the system may need to be able to provide, rather than the value that is requested at any particular time in the lifecycle of the service, and $vDS_j$ is the service-oriented virtualization parameter described above, and additionally:

vE2 is the second elasticity parameter defined previously.

Thus, step 308 removes any virtual links that do not satisfy the two indicated conditions, and the process passes to step 310, in which it is determined if the request can be routed. If there is at least one virtual link that does satisfy the two indicated conditions, the process passes to step 312, in which a path is selected.

If it is determined in step 310 that there are no links that meet the two conditions, the process passes to step 314, and the request to route the service is rejected.

Thus, the method 300 provides for determining whether a request for service can be accepted. In this case the principle is to determine initially whether there is available bandwidth for that specific service in the abstract topology. This determination takes account of bandwidth that has been allocated to other services that have the same priority or a higher priority, and that is therefore considered not to be available to be allocated to the requesting service.

Thus, an aspect provides a method of selecting an end-to-end route within a network comprising a plurality of domains. In some aspects, the method comprises: for a required service, and for each of a plurality of paths in a domain, setting a respective parameter value. Each parameter value is based on resources that are available for the required service. The parameter value is dependent on a priority given to said service. An end-to-end route for the required service is selected based on said parameter values.

If the request is accepted, as indicated in steps 306 and 312 of the process shown in FIG. 3, an End-to-End route is computed, for example by the Virtual Path Computation Element (V-PCE) 140. The End-to-End route passes through one or more of the domains in the network (for example the domains 120*a*, 120*b*, 120*c* in FIG. 1). The End-to-End route is computed on the remaining topology, after any links have been filtered in step 302 or 308 as the case may be. The End-to-End route may be computed using any suitable algorithm, for example a shortest path algorithm such as Dijkstra, Bellman-Ford, etc.

A method of path selection is then performed in each domain that is involved in the computed End-to-End route. For example, the method of path selection may be performed in the local Virtualization Entity associated with the respective domain.

As described in more detail below, the virtualization entity 160 selects the path with minimum available bandwidth that can satisfy the request. The virtualization entity 160 selects the path based on the parameters that were determined previously.

More specifically, for each of the paths that can be used to provide the virtual link corresponding to the required source and destination, the term $(Br+Er-\Sigma DS_{HP})$ is evaluated, where, as before:

Br is the reserved or allocated bandwidth on that particular path;

Er is the elastic bandwidth available on that path; and $DS_{HP}$ is the bandwidth needed by the services that have a higher or equal priority than j and that have previously been allocated to that path.

Then, the path that has the minimum value of that term, exceeding the bandwidth needed by the service being routed, is the path that is selected for that particular virtual link.

This selection has the advantage that the selection of the path has the effect that the value of the parameter $vDS_j$ tends to remain stable. This because the method selects the path with the minimum bandwidth that can satisfy the service request of $DS_j$. Thus, paths with more available bandwidth (which primarily determine the value of the parameter $vDS_j$) tend not to be selected, and so the value of $vDS_j$ is not changed.

Thus, aspects provide a method for selecting a path for a requested service within a domain of a multi-domain network. For a virtual link that can be represented by a plurality of physical paths, there is evaluated for each path the sum of the resources on the path and the elastic resources available on the path, excepting resources already allocated to other services having a priority that is equal to or higher than a priority of said requested service. From the paths for which said sum of said resources exceeds the resources required for said service, the path having the minimum value of the sum of said resources is selected.

Figure 4:
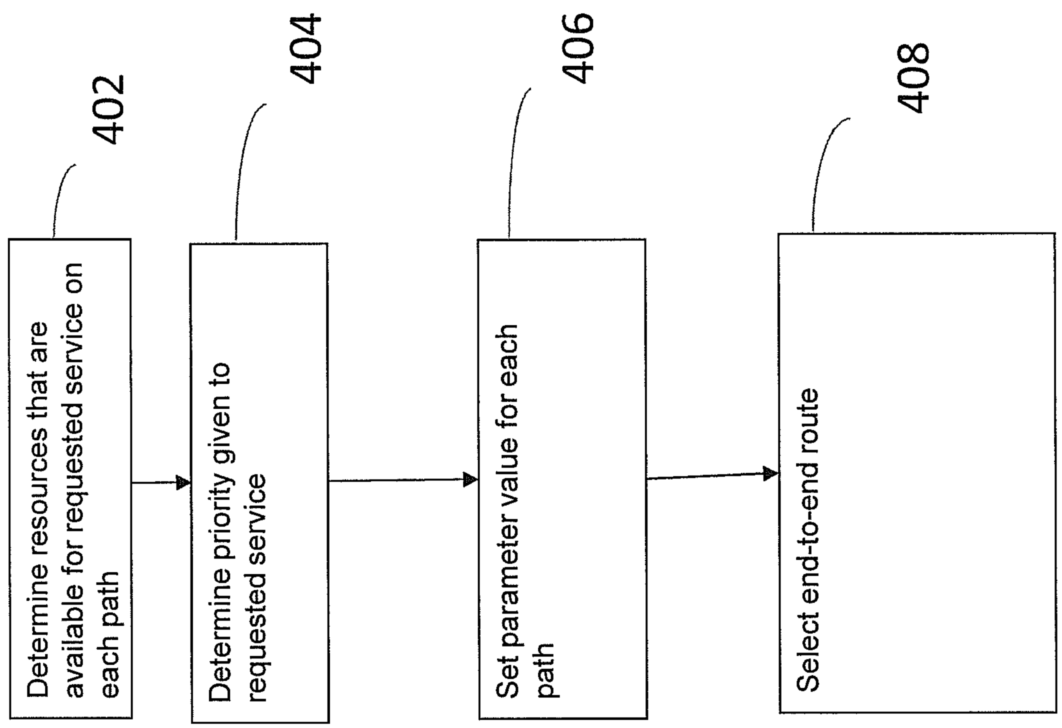
FIG. 4 shows an example of a second method according to an example.

FIG. 4 shows an example method 400.

Thus, a request is received for a required service. In step 402, the resources that are available for the required service are determined. This determination may be made for each path on each virtual link in each domain. In step 404, the priority that is given to the required service is determined.

In step 406, a parameter value is set for the required service, and for each of the plurality of paths in at least one domain, wherein each parameter value is based on resources that are available for the required service, said parameter value being dependent on a priority given to said service. The parameter provides for selection of a virtual link, for which resources are available (e.g. including those allocated to traffic having an equal or lower priority).

In step 408, an end-to-end route is selected for the required service based on said parameter values. This may be carried out in a resources manager.

A system may comprise some or all of: a resource determining module, for determining the resources that are available for the required service; a priority determining module, for determining the priority that is given to the required service; a parameter value setting module; and an end-to-end route computation module.

Figure 5:
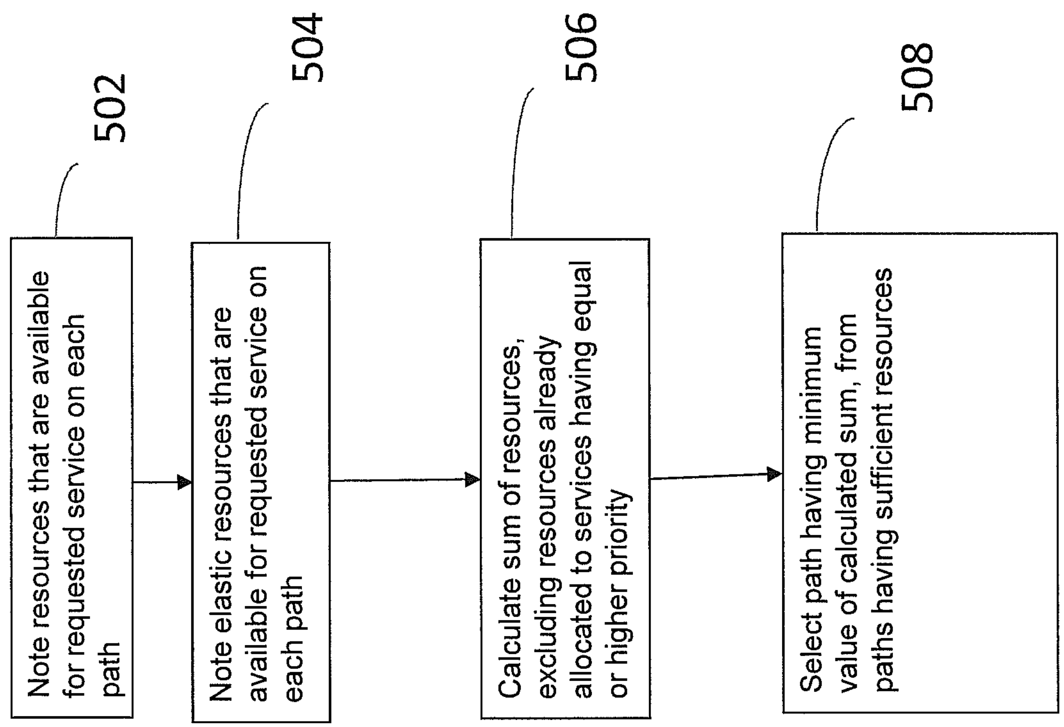
FIG. 5 shows an example of a third method according to an example.

FIG. 5 shows an embodiment of a method, performed when it is determined that a route for a requested service passes over a virtual link of a domain of a multi-domain network, and that the virtual link that can be represented by a plurality of physical paths. In step 502, the resources on the path are noted. In step 504, the elastic resources available on the path are noted. In step 506, the sum of the resources and the elastic resources is calculated, excluding resources already allocated to other services having a priority that is equal to or higher than a priority of said requested service. In step 508, a path is selected from the paths for which said sum of said resources exceeds the resources required for said service, the selected path having the minimum value of said sum of said resources. In some examples, the path selected is a physical path which meets the requirements of resources which are available (optionally including elasticity) due to having an equal or lower priority. The physical path selected is the minimum resource (e.g. minimum bandwidth) which meets the requested resources.

Figure 6:
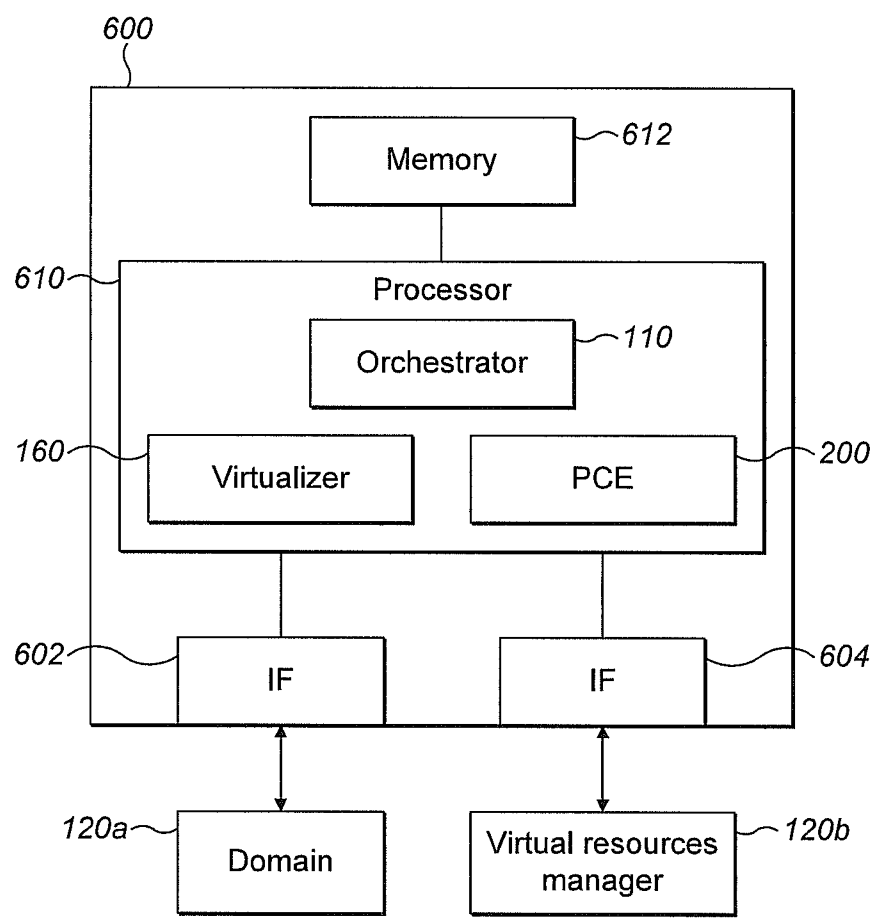
FIG. 6 shows an example of an apparatus according to an example.

FIG. 6 shows an example apparatus 600, including a functional module of one or more of the Orchestrator 110, Virtualizer 160 and PCE 200.

The apparatus 600 is configured to provide support for elasticity in network virtualisation of a heterogeneous, multi-domain network.

The apparatus 600 comprises a first interface 602 for receiving from network domains information about physical paths and the elasticity capability of physical paths in a said network domain 120*a*. The first interface 602 is also configured to transmit information on selected physical paths to the elements of the domain 120*a*.

The apparatus 600 further comprises a second interface 604 for communication with the Virtual Resources Manager 100. The first and/or second interfaces 604 may be physical interfaces or virtual interfaces.

The apparatus 600 comprises a Virtualization Entity 160 configured to calculate physical paths. In some examples, the calculated physcial paths are output from the apparatus 600 to the domain, for example, using interface 602.

The apparatus 600 comprises a virtualizer 140 for summarising physical paths in a said network domain into virtual links. In some examples, a separate instance of the Virtualizer is provided for each domain. Moreover, when a request is accepted, it selects one of the physical paths associated with the virtual link.

The apparatus 600 comprises an orchestrator configured to harmonize information provided by each domain to provide to the virtual resources manager a unified abstract view of the physical network. The orchestrator creates the abstract topology. The orchestrator communicates with the virtual resources manager on the second interface 604.

In some examples, one or more or of the PCE 200, virtualizer 140 and Orchestrator operate in a processing arrangment 610 comprising one or more processors, operatively coupled to a memory 612. The memory is shown separately to the processor 610; the memory may alternatively be considered part of any of the PCE 200, virtualizer 140 and orchestrator.

Examples keep the virtualization of the resources relatively stable, guaranteeing that the elasticity virtualized is always available. The provided abstract view of the network allows an efficient resource allocation also in a multi-domain context with heterogeneous technologies (e.g., packet and optical), control, and vendors. Aspects provide a mechanism for an automatic E2E service provisioning which is unaware of the heterogeneity of the transport domains. This provides a mechanism for automatic provisioning of E2E connections crossing multi-domain networks, and allows an elastic E2E resource allocation in multi-domain scenarios. In some aspects, the method and apparatus organize and summarize the physical resources in a manner that is efficient in terms of resource optimization and maximization of the traffic support. Examples provide a smart selection of intra-domain paths that allows transport resource optimization. A stable view of the virtualized topology is provided. Examples allow exploiting the elasticity features in each domain, and also in the case a domain interworks with domain that does not support elasticity.

Any feature described or claimed may be used in combination with any other described or claimed feature.

The invention claimed is:

1. A method of selecting a physical path to provide a virtual link for a required service within a network comprising a plurality of domains, the method comprising:

for the required service and for each of a plurality of physical paths in a domain, setting, by a network node, a respective parameter value, wherein each parameter value is based on a bandwidth that is available for the required service, and wherein the parameter value is dependent on a priority given to the required service; and selecting, by the network node, the physical path to provide the virtual link for the required service based on the parameter values, wherein selecting the physical path comprises selecting, for the virtual link, a physical path from among the plurality of physical paths, and wherein the selected physical path has a minimum parameter value, which exceeds a bandwidth needed for the required service, of a sum of an allocated bandwidth on the physical path and an elastic bandwidth available on the physical path, minus a bandwidth already allocated on the physical path to other services having a priority that is equal to or higher than the priority given to the required service.

2. The method of claim 1, wherein each parameter value is further based on bandwidth of one of the plurality of physical paths associated with a respective virtual link, excluding the bandwidth already allocated to the other services having the priority that is higher than the priority given to the required service.

3. The method of claim 1, wherein each parameter value is further based on bandwidth of one of the plurality of physical paths associated with a respective virtual link, excluding the bandwidth already allocated to the other services having the priority that is equal to the priority given to the required service.

4. The method of claim 1, wherein each parameter value is further based on the elastic bandwidth available on the physical path.

5. The method of claim 1, further comprising:

setting the respective parameter value for each of a plurality of virtual links in the domain;

excluding any virtual links for which the bandwidth needed by the required service is not less than a virtual bandwidth of respective virtual link; and if any virtual links are not excluded, selecting a physical path for a virtual link that has not been excluded.

6. The method of claim 5, further comprising, when excluding any virtual links for which the bandwidth needed by the required service is not less than the virtual bandwidth of the respective virtual link, additionally excluding any virtual links for which the maximum bandwidth that may be required is less than a bandwidth corresponding to the parameter value set for the required service.

7. The method of claim 5, further comprising, if all virtual links are excluded:

reinstating the excluded virtual links;

excluding any virtual links for which the bandwidth needed by the required service is not less than a sum of the virtual bandwidth of the respective virtual link and a margin parameter; and if any virtual links are not excluded, selecting a physical path for a virtual link that has not been excluded.

8. The method of claim 7, further comprising, if all the virtual links are excluded, rejecting a request to set the physical path.

9. A network node comprising:

a processor, and a memory operatively coupled to the processor and comprising program instructions for execution by the processor, whereby the network node is configured to select a physical path to provide a virtual link for a required service within a network comprising a plurality of domains by:

for the required service and for each of a plurality of physical paths in a domain, setting a respective parameter value, wherein each parameter value is based on a bandwidth that is available for the required service, and wherein the parameter value is dependent on a priority given to the required service; and selecting the physical path to provide the virtual link for the required service based on the parameter values, wherein selecting the physical path comprises selecting, for the virtual link, a physical path from among the plurality of physical paths, and wherein the selected physical path has a minimum parameter value, which exceeds a bandwidth needed for the required service, of a sum of an allocated bandwidth on the physical path and an elastic bandwidth available on the physical path, minus a bandwidth already allocated on the physical path to other services having a priority that is equal to or higher than the priority given to the required service.

10. A method for selecting a physical path for a requested service within a domain of a multi-domain network, the method comprising:

for a virtual link that can be represented by a plurality of physical paths, evaluating, for each physical path, a sum of allocated resources on the physical path and elastic resources available on the physical path, minus resources already allocated on the physical path to other services having a priority that is equal to or higher than a priority of the requested service; and from the plurality of physical paths for which the sum of the allocated resources on the physical path and the elastic resources available on the physical path exceeds resources required for the requested service, selecting the physical path that has a minimum value, among values computed for the plurality of physical paths, of the sum of the allocated resources on the physical path and the elastic resources available on the physical path.

11. The method of claim 10, wherein the resources are bandwidth.

12. A network node comprising:

a processor, and a memory operatively coupled to the processor and comprising program instructions for execution by the processor, whereby the network node is configured to select a physical path for a requested service within a domain of a multi-domain network by:

for a virtual link that can be represented by a plurality of physical paths, evaluating, for each physical path, a sum of allocated resources on the physical path and elastic resources available on the physical path, minus resources already allocated on the physical path to other services having a priority that is equal to or higher than a priority of the requested service; and from the plurality of physical paths for which the sum of the allocated resources on the physical path and the elastic resources available on the physical path exceeds resources required for the requested service, selecting the physical path which has a minimum value, among values computed for the plurality of physical paths, of the sum of the allocated resources on the physical path and the elastic resources available on the physical path.

* * * * *